US012775799B2

(12) United States Patent
Xie et al.

(10) Patent No.: US 12,775,799 B2
(45) Date of Patent: Oct. 27, 2026

(54) GENERATION METHOD FOR SAMPLE DATA, DEVICE AND STORAGE MEDIUM

(71) Applicant: Beijing Volcano Engine Technology Co., Ltd., Beijing (CN)

(72) Inventors: Wenqi Xie, Beijing (CN); Zhaosha Fan, Beijing (CN); Xiaodong Su, Beijing (CN); Minglei Li, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 178 days.

(21) Appl. No.: 18/671,681

(22) Filed: May 22, 2024

(65) Prior Publication Data

US 2024/0394475 A1 Nov. 28, 2024

(30) Foreign Application Priority Data

May 22, 2023 (CN) ........................ 202310582856.3

(51) Int. Cl.
*G06F 40/284* (2020.01)
*G06F 40/253* (2020.01)

(52) U.S. Cl.
CPC .......... *G06F 40/284* (2020.01); *G06F 40/253* (2020.01)

(58) Field of Classification Search
USPC ..................................................... 704/1–504
See application file for complete search history.

(56) References Cited

U.S. PATENT DOCUMENTS 8,488,916 B2 * 7/2013 Terman .................... G09B 5/08 382/187
10,075,384 B2 * 9/2018 Shear ...................... H04L 63/10
(Continued)

FOREIGN PATENT DOCUMENTS

CN 115904932 A 4/2013
CN 112163633 A * 1/2021 ......... G06F 18/2415
(Continued)

OTHER PUBLICATIONS

Office Action for Chinese Patent Application No. 202310582856.3, mailed on Aug. 10, 2026, 26 pages.
(Continued)

*Primary Examiner* — Marcus T Riley
(74) *Attorney, Agent, or Firm* — Astute IP Law Group

(57) ABSTRACT

A generation method and apparatus for sample data, a method and apparatus for information detection, a device and a storage medium are provided, and the generation method includes: acquiring first reference data, the first reference data including target information matching a target information type, and the target information type being a preset information type with a security requirement; performing analysis processing on the target information in the first reference data to generate an analysis result corresponding to the target information, the analysis processing including semantic analysis, lexical structure analysis and grammatical structure analysis; generating a plurality of positive sample information and a plurality of negative sample information based on the analysis result corresponding to the target information; generating a sample data set including positive sample data and negative sample data based on the plurality of positive sample information, the plurality of negative sample information, and second reference data.

16 Claims, 4 Drawing Sheets

(56) References Cited

U.S. PATENT DOCUMENTS

| | | | | |
|---|---|---|---|---|
| 12,229,676 | B2 * | 2/2025 | Charnock | G06N 3/08 |
| 12,293,289 | B2 * | 5/2025 | Charnock | G06N 3/08 |
| 12,401,835 | B2 * | 8/2025 | Govindarajan | G06F 16/90335 |
| 2022/0083813 | A1 * | 3/2022 | Du | G06N 3/0464 |
| 2024/0070457 | A1 * | 2/2024 | Charnock | G06N 3/08 |
| 2024/0070458 | A1 * | 2/2024 | Charnock | G06N 3/08 |
| 2024/0394475 | A1 * | 11/2024 | Xie | G06F 40/284 |
| 2025/0071040 | A1 * | 2/2025 | Wang | G16Y 40/50 |
| 2025/0193462 | A1 * | 6/2025 | Govindarajan | G06F 16/90335 |

FOREIGN PATENT DOCUMENTS

| | | | | |
|---|---|---|---|---|
| CN | 113361267 | A | 9/2021 | |
| CN | 114398680 | A | 4/2022 | |
| CN | 114692628 | A | 7/2022 | |
| CN | 115759043 | A * | 3/2023 | |
| WO | WO-2023030513 | A1 * | 3/2023 | G06F 18/214 |

OTHER PUBLICATIONS

Yang et al., “Automation Detection of Prrtected Health Information from Clinic Narratives”, Journal of Biomedical Informatics, vol. 58 Suppl, Dec. 31, 2015, 25 pages.

Arcaini et al., “MUTREX: a mutation-based generator of fault detecting strings for regular expressions”, 10th IEEE International Conference on Software Testing, Verification and Validation Workshops, Mar. 31, 2017, 10 pages.

* cited by examiner

GENERATION METHOD FOR SAMPLE DATA, DEVICE AND STORAGE MEDIUM

CROSS-REFERENCE TO RELATED APPLICATION

This application claims the priority to and benefits of the Chinese Patent Application, No. 202310582856.3, which was filed on May 22, 2023. The aforementioned patent application is hereby incorporated by reference in its entirety.

TECHNICAL FIELD

The present disclosure relates to the field of computer technology, and in particular to a generation method and apparatus for sample data, a method and apparatus for information detection, a device, and a storage medium.

BACKGROUND

With the development of science and technology, data security has become the focus of current society, so how to accurately and efficiently detect specific data with a security requirement from a large number of data has become an important research content in the field of data security.

In general, a specific data detection model can be used to realize a specific data detection task, which requires that all specific information contained in the input data, specific data types, specific data sample values, index positions of specific data, etc. are identified for a given input data. It can be seen that the accuracy of specific data detection model is particularly important, and the accuracy of specific data detection model is closely related to the sample data set used in training.

SUMMARY

At least one embodiment of the present disclosure provides a generation method and apparatus for sample data, a method and apparatus for information detection, a computer device and a storage medium.

At least one embodiment of the present disclosure provides a generation method for sample data, which includes:

acquiring first reference data, the first reference data including target information matching a target information type, and the target information type being a preset information type with a security requirement;

performing analysis processing on the target information in the first reference data to generate an analysis result corresponding to the target information, the analysis processing including semantic analysis, lexical structure analysis and grammatical structure analysis;

generating a plurality of positive sample information and a plurality of negative sample information based on the analysis result corresponding to the target information; and generating a sample data set including positive sample data and negative sample data based on the plurality of positive sample information, the plurality of negative sample information, and second reference data.

In an alternative embodiment, performing analysis processing on the target information in the first reference data to generate an analysis result corresponding to the target information includes:

performing the semantic analysis on the target information in the first reference data to generate at least one first keyword respectively corresponding to at least one target information type;

performing the lexical structure analysis on the target information in the first reference data to generate at least one first regular expression respectively corresponding to the at least one target information type, each of the at least one first regular expression being used to characterize a lexical structure matching the target information type;

performing the grammatical structure analysis on the target information in the first reference data to generate an information template matching a data type of the first reference data; and generating the analysis result corresponding to the target information based on the at least one first keyword and the at least one first regular expression respectively corresponding to the at least one target information type and the information template matching the data type of the first reference data.

In an alternative embodiment, generating a plurality of positive sample information and a plurality of negative sample information based on the analysis result corresponding to the target information includes:

for each target information type of the at least one target information type, generating a plurality of first information sample values which correspond to the target information type and satisfy a lexical structure of the target information type based on a first regular expression corresponding to the target information type; and according to the information template indicated by the analysis result, generating a plurality of positive sample information of the target information type based on a first keyword and the plurality of first information sample values corresponding to the target information type.

In an alternative embodiment, generating a plurality of positive sample information and a plurality of negative sample information based on the analysis result corresponding to the target information includes:

for each target information type of the at least one target information type, performing preset operation on a first keyword corresponding to the target information type to generate a second keyword, the preset operation including a truncation operation and/or a character addition operation;

generating a second information sample value which does not satisfy a lexical structure of the target information type based on a first regular expression corresponding to the target information type; and according to the information template indicated by the analysis result, generating a plurality of negative sample information of the target information type based on the second keyword and the second information sample value corresponding to the target information type.

In an alternative embodiment, generating a second information sample value which does not satisfy a lexical structure of the target information type based on a first regular expression corresponding to the target information type includes:

generating a first information sample value corresponding to the target information type based on the first regular expression corresponding to the target information type; performing a preset operation on the first information sample value corresponding to the target information type to generate the second information sample value; and/or generating a second regular expression which does not satisfy the lexical structure of the target information type based on the first regular expression corresponding to the target information type; generating the second information sample value corresponding to the target information type based on the second regular expression.

In an alternative embodiment, first reference data further includes confusing information, the confusing information is information that interferes with detection of the target information, and the generation method further includes:

performing the semantic analysis on the confusing information in the first reference data to generate a third keyword corresponding to at least one target information type;

determining a third information sample value corresponding to the third keyword from the confusing information; and generating a plurality of negative sample information of the target information type based on the third keyword and the third information sample value corresponding to the at least one target information type.

In an alternative embodiment, a number of pieces of second reference data is more than one, and the generating a sample data set including positive sample data and negative sample data based on the plurality of positive sample information, the plurality of negative sample information, and second reference data includes:

for each piece of second reference data, determining an insertion scheme of the second reference data based on a set proportional parameter and a random number generated for the second reference data, the insertion scheme including inserting positive sample information, inserting negative sample information, and not inserting sample information;

when the insertion scheme of the second reference data is inserting target sample information, inserting the target sample information into the second reference data to generate target sample data, where the target sample information includes the positive sample information and/or the negative sample information, when the target sample information includes the positive sample information, the target sample data includes the positive sample data, and when the target sample information includes the negative sample information, the target sample data includes the negative sample data;

determining labeling information of the positive sample data, the labeling information including the target information type, information sample value, an initial index position of the information sample value in the positive sample data, and content information of the information sample value in the positive sample data; and forming the sample data set based on a plurality of pieces of negative sample data and positive sample data associated with the labeling information.

In an alternative embodiment, inserting the target sample information into the second reference data to generate target sample data includes:

determining an insertion parameter corresponding to the second reference data, the insertion parameter including a number of insertion positions, a number of samples corresponding to each of the insertion positions, and a target information type corresponding to each of the insertion positions;

determining insertion positions matching the number of insertion positions from the second reference data;

acquiring sample information to be inserted corresponding to each of the insertion positions according to the number of samples corresponding to each of the insertion positions and the target information type corresponding to each of the insertion positions; and inserting the sample information to be inserted corresponding to each of the insertion positions into the second reference data to generate target sample data.

At least one embodiment of the present disclosure further provides a method for information detection, which includes:

detecting information content included in data to be detected by using an information detection model to obtain a detection result corresponding to the data to be detected; and when the detection result indicates that the data to be detected includes target information belonging to a target information type, generating prompt information, where the information detection model is trained by using a sample data set, and the sample data set is generated according to the generation method for sample data according to at least one of the above embodiments of the present disclosure.

At least one embodiment of the present disclosure further provides a generation apparatus for sample data, which includes:

an acquisition module, configured to acquire first reference data, where the first reference data includes target information matching a target information type, and the target information type is a preset information type with a security requirement;

a first generation module, configured to perform analysis processing on the target information in the first reference data to generate an analysis result corresponding to the target information, where the analysis processing includes semantic analysis, lexical structure analysis and grammatical structure analysis;

a second generation module, configured to generate a plurality of positive sample information and a plurality of negative sample information based on the analysis result corresponding to the target information; and a third generation module, configured to generate a sample data set including positive sample data and negative sample data based on the plurality of positive sample information, the plurality of negative sample information, and second reference data.

At least one embodiment of the present disclosure further provides an apparatus for information detection, which includes:

a detection module, configured to detect information content included in data to be detected by using an information detection model to obtain a detection result corresponding to the data to be detected; and a fifth generation module, configured to generate prompt information when the detection result indicates that the data to be detected includes target information belonging to a target information type, where the information detection model is trained by using a sample data set, and the sample data set is generated according to the generation method for sample data according to at least one of the above embodiments of the present disclosure.

At least one embodiment of the present disclosure further provides a computer device, which includes: at least one processor, a memory and a bus, where the memory stores machine-readable instructions executable by the at least one processor; the at least one processor communicates with the memory through the bus upon running of the computer device, and the machine-readable instructions, upon being executed by the at least one processor, execute the generation method for sample data or the method for information detection according to at least one of the above embodiments of the present disclosure.

At least one embodiment of the present disclosure further provides a non-transient computer-readable storage medium which stores computer programs, the computer programs, upon being run by at least one processor, executing the generation method for sample data or the method for information detection according to at least one of the above embodiments of the present disclosure.

In order to make the aforementioned objects, features and advantages of the present disclosure more comprehensible, embodiments accompanied with the drawings are described in detail below.

BRIEF DESCRIPTION OF DRAWINGS

To more clearly illustrate the embodiments of the present disclosure, the drawings required to be used for the embodiments are briefly described in the following. The drawings herein are incorporated into and form a part of the specification, illustrate embodiments consistent with the present disclosure, and are used in conjunction with the specification to explain the principles of the present disclosure. It should be understood that are only some embodiments of the present disclosure, and therefore should not be regarded as limiting the scope. For those skilled in the art, other drawings can be obtained based on these drawings without any inventive work.

DETAILED DESCRIPTION

Figure 1:
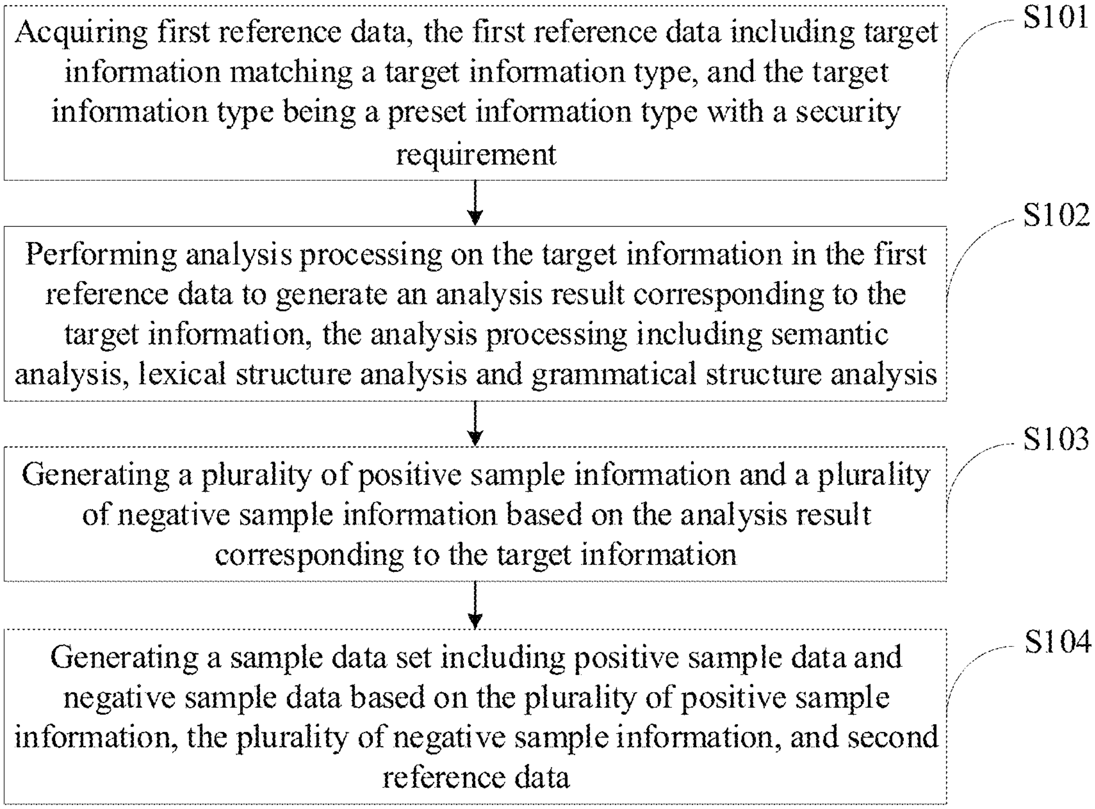
FIG. 1 shows a flowchart of a generation method for sample data provided by an embodiment of the present disclosure.

To make the objects, technical solutions and advantages of the present disclosure clearer, the technical solutions of the embodiments of the present disclosure will be described clearly and fully understandable in conjunction with the drawings related to the embodiments of the present disclosure. Apparently, the described embodiments are just a part but not all of the embodiments of the present disclosure. The components in the embodiments of the present disclosure generally described and illustrated in the drawings herein may be arranged and designed in various different configurations. Therefore, the following detailed description of the embodiments of the present disclosure provided in the accompanying drawings is not intended to limit the scope of the claimed disclosure, but merely represents selected embodiments of the present disclosure. Based on the described embodiments herein, those skilled in the art can obtain other embodiment(s), without any inventive work, which should be within the scope of the present disclosure.

General data can be divided into structured data and unstructured data according to the carrier form. Structured data is generally stored in a database, and specific data detection with a security requirement can be directly performed through the precise definition of metadata. Because of the variety of data formats of unstructured data, such as relying solely on traditional rules such as keywords to detect specific data, there is a lack of context semantic level analysis, which leads to inaccurate detection of specific data. Therefore, the specific data detection task may be realized by using the specific data detection model. The specific data detection task requires identifying all the specific information contained in the input data, detecting the specific data type, the specific data sample value, the index position of the specific data, etc. for a given input data. It can be seen that the accuracy of specific data detection model is particularly important, and the accuracy of specific data detection model is closely related to the sample data set used in training.

It is found that the sample data set used for specific data detection is difficult to acquire, on the one hand, the original specific data is difficult to acquire. Specifically, in order to protect information security and reduce the risk of specific data leakage, the data provider will not provide a large number of specific data to the third party for model training, which makes the sample size of data available to the third party not meet the demand. On the other hand, it is difficult to quantify the specific data labeling level. Because of the specificity of specific data, the data labeling work needs the data project specialist to label the specific data, which cannot be leaked to other personnel for labeling. The data labeling efficiency is low, and the standards of specific data in different business scenarios are different, and there are many specific types. When manual labeling scheme is adopted, the labeling cost is high. Therefore, how to construct a sample data set with high efficiency and low cost for training a specific data detection model is an urgent problem to be solved.

Based on the above research, the present disclosure provides a generation method and apparatus for sample data, a method and apparatus for information detection, a computer device and a storage medium. According to the generation method for sample data, first reference data is acquired, and because the first reference data includes target information matching a target information type, an analysis result corresponding to the target information is generated by performing analysis processing on the target information in the first reference data. The analysis processing includes semantic analysis, lexical structure analysis and grammatical structure analysis. For example, the analysis result may indicate the semantics, lexical structure and grammatical structure of the target information, and then a plurality of positive sample information and a plurality of negative sample information are generated based on the analysis result corresponding to the target information, so that the positive sample information matches the structure of the target information and the negative sample information does not match the structure of the target information. Then, based on the plurality of positive sample information, the plurality of negative sample information and the second reference data, a large number of positive sample data and negative sample data are generated flexibly, and the construction of sample data set is realized.

It should be noted that like reference numbers and letters refer to like items in the following drawings, and thus, once an item is defined in one drawing, it need not be further defined or explained in subsequent drawings.

The term "and/or" herein merely describes an associative relationship, meaning the presence of three relationships; for example, A and/or B may mean that A exists alone, A and B exist simultaneously, and B exists alone. In addition, the term "at least one" herein means any one of a plurality of elements or any combination of at least two of a plurality of elements, for example, including at least one of A, B, C may mean including any one or more elements selected from the group consisting of A, B and C.

It can be understood that before using the technical solutions disclosed in various embodiments of the present disclosure, users should be informed of the types, scope of use, use scenarios, etc. of personal information involved in the present disclosure in an appropriate way according to relevant laws and regulations and be authorized by the users.

For example, in response to receiving an active request from a user, prompt information is sent to the user to clearly prompt the user that an operation requested by the user to be performed will require acquisition and use of personal information of the user. Therefore, the user can independently choose whether to provide personal information to software or hardware such as a computer device, an application program, a server or a storage medium that performs the operations of the technical solution of the present disclosure according to the prompt information.

As an optional but non-limiting implementation, in response to receiving the active request of the user, the prompt information may be sent to the user by, for example, a pop-up window, in which the prompt information can be presented in the form of text. In addition, the pop-up window can also carry a selection control for the user to choose "agree" or "disagree" to provide personal information to the computer device.

It can be understood that the above process of notifying and acquiring user authorization is only schematic, and does not limit the implementation of the present disclosure, and other ways meeting relevant laws and regulations may also be applied to the implementation of the present disclosure.

In order to facilitate understanding of the present embodiment, firstly, a generation method for sample data disclosed in the present embodiment of the disclosure is introduced in detail. The execution subject of the generation method for sample data provided in embodiments of the present disclosure is generally a computer device with certain computing power, which includes, for example, a terminal device or a server or other processing device, and the terminal device may be a user equipment (UE), a mobile device, a computing device, etc. In some possible implementations, the generation method for sample data may be realized by a processor calling computer-readable instructions stored in a memory.

The generation method for sample data provided by embodiments of the present disclosure will be described below by taking the execution subject as the terminal device as an example.

Referring to FIG. 1, FIG. 1 is a flowchart of a generation method for sample data provided by an embodiment of the present disclosure, and the generation method includes S101~S104.

S101, acquiring first reference data, the first reference data including target information matching a target information type, and the target information type being a preset information type with a security requirement.

S102, performing analysis processing on the target information in the first reference data to generate an analysis result corresponding to the target information, the analysis processing including semantic analysis, lexical structure analysis and grammatical structure analysis.

S103, generating a plurality of positive sample information and a plurality of negative sample information based on the analysis result corresponding to the target information.

S104, generating a sample data set including positive sample data and negative sample data based on the plurality of positive sample information, the plurality of negative sample information, and second reference data.

S101-S104 will be described in detail below.

For S101, the first reference data may include target information, the target information matches a target information type, and the target information type is a preset information type with a security requirement, and the information type with the security requirement may be set according to a business requirement, for example, a specific information type may be determined as an information type with a security requirement, for example, the target information type may include name information, phone information, mail information, address information, etc. It may also include company information, gender information, etc.

The first reference data may be unstructured data, and the data type of the first reference data may include business log, natural text, buried data, etc. During the implementation, a small amount of first reference data may be acquired, and analysis processing may be performed respectively on each acquired first reference data to obtain a plurality of positive sample information and negative sample information.

Taking the data type of the first reference data as the business log as an example, the first reference data may be: "Name: aaaaaaxxxxxx Co., Ltd. Addr: bbb Street bbbbb District XXXXXXXXXX Park, Building 4 Contacts:[Contact({ID: <aaa> Name: Wang Mobile: 133**8888 Email: wang@aaaaa.com merchant: xx City xx Street IdentityName: Super Administrator CreateTime: 1111111111 npm:[""Mysql®2.xx.1"", ""axios@0.yy.0""]})]". In the above example, the target information may include "Name: WangMobile: 133**8888 Email: wang**@aaaaa.com merchant: xx City xx Street".

For S102 and S103, analysis processing is performed on the target information in the first reference data to generate an analysis result corresponding to the target information. The analysis processing may for example include semantic analysis, lexical structure analysis and grammatical structure analysis. The analysis result may include semantic information obtained by semantic analysis, lexical structure obtained by lexical structure analysis and grammatical result obtained by grammatical structure analysis.

Specifically, the lexical structure can be used to describe the character sequence of the smallest language unit that can be used independently, and can be used to indicate the information structure or composition form of the sample value of the target information type. The grammatical structure can be used to describe the dependency or composition pattern between words, and can indicate the co-occurrence pattern (i.e. the co-occurrence pattern between the keyword and the information sample value in the target information) of the target information in the unstructured data (i.e., the first reference data). Language is used to describe the specific meaning of a word or entity. Because different contextual words have different contributions to identifying a specific data entity in a specific data detection task, the semantic information here can indicate the keyword that has the greatest contribution to identifying a specific data sample entity or a non-specific sample entity in the context of the unstructured data.

For example, the semantic analysis is performed on the target information to generate the first keyword included in the target information. For example, the lexical structure analysis is performed on the target information to generate a first regular expression characterizing the lexical structure of the target information type to which the target information belongs. For example, the semantic analysis is performed on the target information to generate an information template.

In an alternative embodiment, in S102, performing analysis processing on the target information in the first reference data to generate an analysis result corresponding to the target information specifically includes S1021~S1024.

S1021, performing the semantic analysis on the target information in the first reference data to generate at least one first keyword respectively corresponding to at least one target information type.

S1022, performing the lexical structure analysis on the target information in the first reference data to generate at least one first regular expression respectively corresponding to the at least one target information type, each of the at least one first regular expression being used to characterize a lexical structure matching the target information type.

S1023, performing the grammatical structure analysis on the target information in the first reference data to generate an information template matching a data type of the first reference data.

S1024, generating the analysis result corresponding to the target information based on the at least one first keyword and the at least one first regular expression respectively corresponding to the at least one target information type and the information template matching the data type of the first reference data.

In S1021, the semantic analysis is performed on the target information in the first reference data to generate at least one first keyword corresponding to at least one target information type. In practice, for example, an identifying keyword included in each target information in the first reference data may be extracted and determined as the first keyword of the target information type to which the target information belongs. And an approximate keyword with the same meaning may also be determined according to the identifying keyword, and determine the identifying keyword and the approximate keyword as the first keyword of the target information type to which the target information belongs.

For example, when the target information type is a phone type, the first keyword of the target information type may include but not limited to "mobile", "phone", "tel", etc. When the target information type is a mail type, the first keyword of the target information type may include but not limited to "mail", "receiver" and "sender". When the target information type is an address type, the first keyword under the target information type may include but not limited to "addr" and "location". When the target information type is a name type, the first keyword under the target information type may include but not limited to "name" and "employee".

In S1022, the lexical structure analysis is performed on the target information in the first reference data to generate at least one first regular expression corresponding to the at least one target information type. The first regular expression is used to characterize the lexical structure matching the target information type. The regular expression is a logical formula for string operation, which makes predefined special characters and combinations of special characters form a "regular string" to express the filtering logic of the string. For example, when the target information type is a phone type, the phone type generally includes eleven characters, with 1 as the first character. Therefore, after the lexical structure is performed on the target information of the phone type, the first regular expression of the phone type may be "1 [3-9] \d {9}", which means starting with 1, the second character is any number from 3 to 9, and the third character to the eleventh character is any number from 0 to 9.

In S1023, the grammatical structure analysis is performed on the target information in the first reference data to generate an information template matching a data type of the first reference data. By analyzing the target information, it can be seen that the co-occurrence between the keyword and the information sample value in the target information may be one-to-one, and one-to-many. One-to-one structure represents one keyword corresponding to one information sample value, and one-to-many structure represents one keyword corresponding to a plurality of information sample values.

When the data type of the first reference data is log text, the one-to-one information template may include but not limited to: "Key": "Value"; \ "key\": \ "value\"; key=value; {"key": "kcy", "value": "value"}; Key is value and the like. One-to-many information templates may include but are not limited to: "key": ["value", "value", . . . ]; "kcy": "key", "values": ["value", . . . ].

When the data type of the first reference data is natural text, because the natural text usually does not include special characters, it usually adopts the format of a phrase, so the information template of the natural text may be designed as follows. The one-to-one information template includes but is not limited to: My key is value; key is value and the like. The one-to-many information template include but is not limited to: key includes value1, value2, value3, etc.

When the data type of the first reference data is buried data, the information template may also use a json object because the buried data is mostly recorded using a string in json format, so the information template of the buried data may be designed as follows. The one-to-one information template includes but not limited to: {"key": "value"} and the like. The one-to-many information template include but is not limited to: {"key": ["Value1", "Value2", "Value3"]} and the like.

In S1024, the at least one first keyword and the at least one first regular expression corresponding to the at least one target information type, and the information template matching the data type of the first reference data may be formed into the analysis result corresponding to the target information. That is, the analysis result includes the semantic information, the lexical structure information and the grammatical structure information.

By performing analysis processing on the target information, which includes the semantic analysis, the lexical structure analysis and the grammatical structure analysis, the obtained analysis result include the first keyword, the first regular expression and the information template corresponding to the target information type. Then, according to the first keyword, the first regular expression and the information template, a large number of positive sample information matching the structure of the target information and negative sample information not matching the structure of the target information can be generated efficiently and conveniently, which improves the convenience of sample construction.

After obtaining the analysis result corresponding to the target information, a large number of positive sample information and negative sample information may be generated according to the analysis result. For example, according to the lexical structure matching the target information type indicated by the analysis result, a positive information sample value matched with the lexical structure of the target information type may be generated, and then for any target information type, a keyword and a positive information sample value of the target information type may be randomly selected to fill in the information template to generate positive sample information of the target information type. Or, according to the lexical structure matching the target information type indicated by the analysis result, a negative information sample value that does not match the lexical structure of the target information type may be generated, and then for any target information type, a keyword and a negative information sample value of the target information type may be randomly selected to fill in the information template to generate negative sample information of the target information type.

The processes of generating positive sample information and generating negative sample information are described in detail below.

In an alternative embodiment, generating a plurality of positive sample information based on the analysis result corresponding to the target information includes steps a1~a2.

Step a1, for each target information type, generating a plurality of first information sample values which correspond to the target information type and satisfy a lexical structure of the target information type based on a first regular expression corresponding to the target information type.

Step a2, according to the information template indicated by the analysis result, generating a plurality of positive sample information of the target information type based on a first keyword and the plurality of first information sample values corresponding to the target information type.

In step a1, for each target information type, the plurality of first information sample values which correspond to the target information type and satisfy the lexical structure of the target information type may be generated according to the first regular expression corresponding to the target information type. In practice, a corresponding state machine may be constructed based on the first regular expression, and the first information sample value may be generated by using the state machine, where the state machine consists of states, transition conditions between states and actions.

Figure 2:
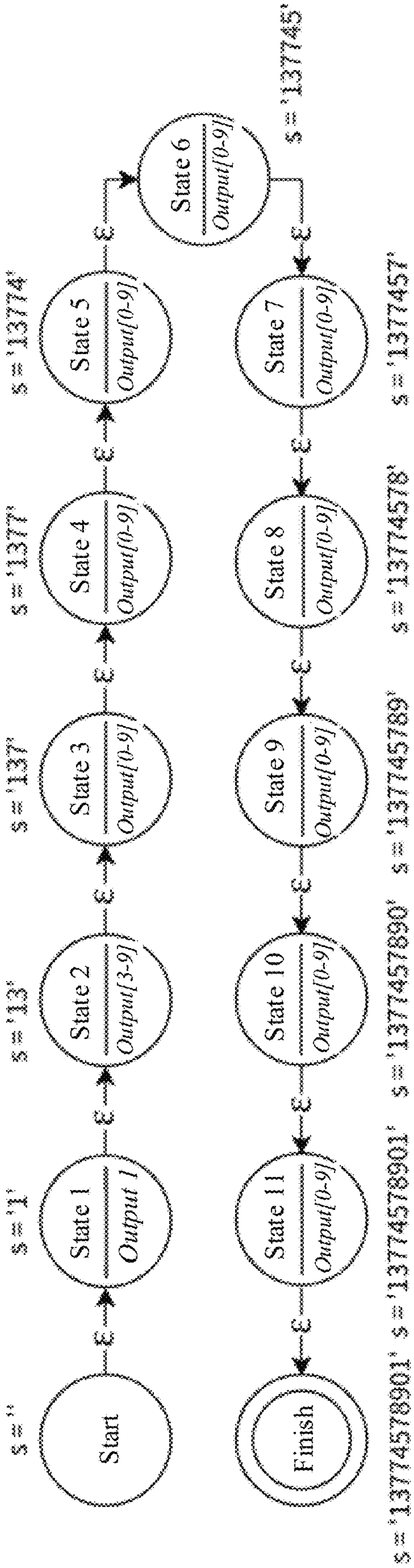
FIG. 2 shows a flowchart of generating an information sample value in the generation method for sample data provided by an embodiment of the present disclosure.

As shown in FIG. 2, the state machine includes state boxes, transition arrows and transition conditions. The state box indicates the state by a circle, including "start", "end" and a plurality of states, where the text above horizontal line in the circle indicates different states, and the text below the horizontal line indicates the action (the action is not necessary) performed by the state. The transition arrow indicates the direction of state transition, and the transition condition is a trigger condition labeled on the transition arrow, and "ε" in FIG. 2 represents unconditional transition. When the target information type is the phone type, the first regular expression is "1 [3-9]\d{9}", and the generated state machine is traversed from the start state to the end state, the character output from each transition during traversal is stored and spliced after the string "s", and the first information sample value satisfying the first regular expression is finally obtained, that is, the first information sample values of a plurality of phone types may be generated in FIG. 2. From FIG. 2, it can be seen that the first information sample value generated at this time is "13774578901".

In step a2, for each target information type, the first keyword may be selected from first keywords corresponding to the target information type and the first information sample value may be selected from a plurality of first information sample values corresponding to the target information type, and the information template may be filled with the selected first keyword and the first information sample value to generate positive sample information of the target information type, so that the positive sample information of each target information type can be generated simply.

After the positive sample information is generated, the target information type sensitive_type, the information sample value sensitive_value (i.e., the first information sample value), and the initial index position index_start of the information sample value in the positive sample information of the positive sample information sensitive_pos_sample may also be recorded. For example, a quadruple may be used to uniquely identify the positive sample information. That is, the quadruple pos_sample (sensitive_pos_sample, sensitive_type, sensitive_value, index_start).

Through the first regular expression of each target information type, a plurality of first information sample values of each target information type may be generated. Because the first regular expression is used to represent the information structure of the target information type, the structure of the generated first information sample values meets the requirements of the target information type. Then, based on the first keyword and the first information sample value corresponding to the target information type, according to the information template, a plurality of positive sample information of the target information type can be generated, thus improving the generation efficiency of positive sample information.

In an alternative embodiment, generating a plurality of negative sample information based on the analysis result corresponding to the target information includes steps b1~b3.

Step b1, for each target information type, performing preset operation on a first keyword corresponding to the target information type to generate a second keyword, the preset operation including a truncation operation and/or a character addition operation.

Step b2, generating a second information sample value which does not satisfy a lexical structure of the target information type based on a first regular expression corresponding to the target information type.

Step b3, according to the information template indicated by the analysis result, generating a plurality of negative sample information of the target information type based on the second keyword and the second information sample value corresponding to the target information type.

In step b1, for each target information type, the preset operation is performed on the first keyword corresponding to the target information type, and the preset operation includes a truncation operation and a character addition operation to generate the second keyword. For example, when the preset operation includes the truncation operation, the first keyword may be truncated to obtain a substring, and the obtained substring may be determined as a second keyword. For example, if the first keyword is "name", the second keyword obtained from the truncation may be "nam" and "ame". Alternatively, the first keyword may be randomly sampled to obtain a subsequence, and the obtained subsequence may be determined as the second keyword. For example, if the first keyword is "telephone", the second keyword obtained by sampling may be "tehone".

When the preset operation includes the character addition operation, the first keywords of different target information types may be randomly spliced, and the word obtained by splicing may be used as the second keyword. For example, when the first keywords of different target information types are "name" and "phone", then "name phone" is obtained by splicing, and "name phone" is determined as the second keyword. Alternatively, redundant characters may be added before and after the first keyword, and the obtained string may be determined as the second keyword. For example, if the first keyword is "name", the obtained second keyword may be "nametele" and "onename".

In practice, a regular expression that does not conform to the lexical structure of the first keyword of the target information type may also be set, and a second keyword may be generated through the set regular expression. For example, when the first keyword is "name", the generated regular expression may be "n [b-z] me", and the generated second keyword may be "nbme", "ndme" and the like.

In step b2, based on the first regular expression corresponding to the target information type, a second information sample value that does not satisfy the lexical structure of the target information type is generated. For example, when the first regular expression indicates that the length of the first information sample value of the phone type is 11 bits, the length of the second information sample value that does not satisfy the lexical structure of the target information type may be 10 bits, 12 bits, etc.

In an alternative embodiment, in step b2, generating a second information sample value which does not satisfy a lexical structure of the target information type based on a first regular expression corresponding to the target information type specifically includes mode 1 and mode 2.

Mode 1, generating a first information sample value corresponding to the target information type based on the first regular expression corresponding to the target information type; performing a preset operation on the first information sample value corresponding to the target information type to generate the second information sample value.

Mode 2, generating a second regular expression which does not satisfy the lexical structure of the target information type based on the first regular expression corresponding to the target information type; generating the second information sample value corresponding to the target information type based on the second regular expression.

In the mode 1, the first information sample value corresponding to the target information type may be generated based on the first regular expression corresponding to the target information type. The process of generating the first information sample value can refer to the foregoing description of step a1, which is not described in detail here. After obtaining the first information sample value corresponding to the target information type, a preset operation may be performed on the first information sample value, which may include, for example, a truncation operation and a character addition operation to generate a second information sample value, the processes of truncation operation and character addition operation here can refer to the process of generating a second keyword in step b1. According to the first information sample value, the second information sample value can be obtained more conveniently and efficiently.

For example, when the first information sample value of the phone type is "13355558888", the first information sample value is truncated, and the generated second information sample value may include "133555888" and "1338888". Alternatively, the first information sample value is added with a string, and the generated second information sample value may include "133555588822" and "222 @ aaa.com-1335558888".

In the mode 2, a second regular expression that does not satisfy the lexical structure of the target information type may be generated based on the first regular expression corresponding to the target information type. For example, when the first regular expression of the phone type is "1 [3-9]\d{9}", the generated second regular expression may be "[2-9][2-9]\d{9}" and the like. Then, based on the second regular expression, a second information sample value corresponding to the target information type that does not satisfy the lexical structure of the target information type can be generated, the process of generating the second information sample value according to the second regular expression can refer to the process of generating the first information sample value based on the first regular expression in the aforementioned step a1, which is not described in detail here.

A plurality of modes are set up to flexibly generate the second information sample value and improve the diversity of the second information sample value.

In step b3, after obtaining the second keyword and the second information sample value of each target information type, the selected second keyword and the second information sample value may be filled into the information template for each target information type to generate negative sample information of the target information type.

In practice, a plurality of filling methods may be set to generate negative sample information, such as "first keyword-second information sample value", "second keyword-first information sample value" and "second keyword-second information sample value". The filling method of "first keyword-second information sample value" is as follows: acquiring the first keyword and the second information sample value of the target information type, and filling the acquired first keyword and the second information sample value into the information template to generate the negative sample information. The filling method of "second keyword-first information sample value" is as follows: acquiring the second keyword and the first information sample value of the target information type, and filling the acquired second keyword and the first information sample value into the information template to generate the negative sample information. The filling method of "second keyword-second information sample value" is as follows: acquiring the second keyword and the second information sample value of the target information type, and filling the acquired second keyword and the second information sample value into the information template to generate the negative sample information.

For example, when the template information is Key": "Value", the Key in the template information may be replaced by the acquired second keyword, and the Value in the template information may be replaced by the acquired second information sample value to obtain the negative sample information.

By determining the second keyword and the second information sample value of the target information type, based on the second keyword and the second information sample value corresponding to the target information type, a plurality of negative sample information of the target information type are generated according to the information template, so that the construction of negative sample information is realized, the generation efficiency of negative sample information is improved, and the diversity of negative sample information is enriched.

Considering that when detecting specific information, there may be similar information or interference information, which will affect the detection result, in order to make the specific information detection model better identify the interference information, the present disclosure proposes to construct negative samples based on the interference information, so that the specific information detection model can learn the characteristics of the interference information during the training process and improve the accuracy of the specific information detection task.

For example, the first reference data is “Name: aaaaaaxxxxxx Co., Ltd. Addr: bbb Street bbbbb District xxxxxxxxxx Park, Building 4 Contacts:[Contact({ID: <aaa> Name: Wang Mobile: 133**8888 Email: wang@aaaaa.com merchant: xx City xx Street IdentityName: Super Administrator CreateTime: 1111111111 npm:[““Mysql®2.xx.1””, ““axios@0.yy.0””]})]. In the above example, the target information may include” Name: WangMobile: 133**8888 Email: wang**@aaaaa.com merchant: xx City xx Street”. It is found that “Super Administrator” may be misreported as specific information of name type during the detection process. The third-party installation module of npm [““MySQL@2.xx.1”” and ““Axios@0.yy.0 ””] is misreported as email information, so it is determined that confusing information exists in the first reference data, which is “IdentityName: Super Administrator” and “npm: [““Mysql®2.xx.1””, ““axios@0.yy.0””]”.

When the first reference data includes confusing information that interferes with the detection of the target information, the negative sample information may be generated based on the confusing information. In a specific implementation, the method further includes steps c1~c3.

Step c1, performing the semantic analysis on the confusing information in the first reference data to generate a third keyword corresponding to at least one target information type.

Step c2, determining a third information sample value corresponding to the third keyword from the confusing information.

Step c3, generating a plurality of negative sample information of the target information type based on the third keyword and the third information sample value corresponding to the at least one target information type.

In practice, it is possible to perform semantic analysis on the confusing information and generate the third keyword of at least one target information type, for example, in the above case, the third keyword “IdentityName” of the name type and the third keyword “npm” of the mail type are generated. And from the confusing information, determine the third information sample value corresponding to the third keyword, for example, the third information sample value of the third keyword “IdentityName” is “Super Administrator” and the third information sample value of the third keyword “npm” is ““Mysql®2.xx.1””, ““axios@0.yy.0””. Then “IdentityName” and “Super Administrator” may be filled into the information template to generate negative sample information of the name type. “npm” and ““Mysql®2.xx.1””, ““axios@0.yy.0”” may be filled into the information template to generate negative sample information of the mail type.

Alternatively, a regular expression may be constructed based on the third information sample value of the third keyword, and a plurality of third information sample values corresponding to the third keyword may be generated by using the constructed regular expression, and then the information template may be filled based on the third keyword and the plurality of third information sample values to generate negative sample information of a plurality of target information types.

The negative sample information is constructed by using the third keyword and the third information sample value generated by the confusing information, which enriches the content of negative sample information, so that the specific information detection model obtained by subsequent training can better identify confusing information and improve the detection accuracy of specific information detection tasks.

For S104, the negative sample information may be inserted into the second reference data to generate the negative sample data, and the positive sample information may be inserted into the second reference data to generate the positive sample data. A plurality of pieces of positive sample data and a plurality of pieces of negative sample data constitute a sample data set. The second reference data may be data that does not include the target information type, that is, the second reference data does not include specific information. Alternatively, a sample data set may be constructed based on the positive sample data, the negative sample data and the first reference data.

In an alternative embodiment, the number of pieces of second reference data is more than one, and generating a sample data set including positive sample data and negative sample data based on the plurality of positive sample information, the plurality of negative sample information, and second reference data specifically includes steps d1~d4.

Step d1, for each piece of second reference data, determining an insertion scheme of the second reference data based on a set proportional parameter and a random number generated for the second reference data, the insertion scheme including inserting positive sample information, inserting negative sample information, and not inserting sample information.

Step d2, when the insertion scheme of the second reference data is inserting target sample information, inserting the target sample information into the second reference data to generate target sample data, where the target sample information includes the positive sample information and/or the negative sample information, when the target sample information includes the positive sample information, the target sample data includes the positive sample data, and when the target sample information includes the negative sample information, the target sample data includes the negative sample data.

Step d3, determining labeling information of the positive sample data, the labeling information including the target information type, information sample value, an initial index position of the information sample value in the positive sample data, and content information of the information sample value in the positive sample data.

Step d4, forming the sample data set based on a plurality of pieces of negative sample data and positive sample data associated with the labeling information.

In step d1, the proportional parameter may characterize the ratio of the positive sample data, the negative sample data and original data (e.g., the second reference data excluding positive sample information and negative sample information) included in the sample data set. For example, the proportional parameter may include: (proportion–0.6, negative_proportion–0.8), and the ratio of the positive sample data, the negative sample data and the original data in the sample data set may be close to 0.6:0.2:0.2 according to the above proportional parameter.

In practice, after setting the proportional parameter, for each second reference data, a random number (the random number is a numerical value between [0-1]) may be generated for the second reference data, and the insertion scheme of the second reference data may be determined according to the probability interval where the random number is located. For example, if the random number is greater than or equal to 0 and less than or equal to the proportion, the insertion scheme of the second reference data is inserting positive sample information; if the random number is greater than or equal to the proportion and less than or equal to the negative_proportion, the insertion scheme of the second reference data is inserting negative sample information; if the random number is greater than negative_proportion and less than or equal to 1, the insertion scheme of the third reference data is not inserting sample information. In practice, if the random number is equal to proportion, the insertion scheme may include inserting positive sample information and inserting negative sample information.

In step d2, if the insertion scheme of the second reference data is not inserting the sample information, the second reference data is directly taken as the sample data in the sample data set. If the insertion scheme of the second reference data is inserting positive sample information, one or more positive sample information is randomly acquired, and the acquired positive sample information is inserted into the second reference data, for example, the acquired positive sample information may be inserted after any delimiter of the second reference data to generate positive sample data. If the insertion scheme of the second reference data is inserting negative sample information, one or more negative sample information are randomly acquired, and the acquired negative sample information is inserted into the second reference data, for example, the acquired negative sample information may be inserted after any delimiter of the second reference data to generate negative sample data.

In practice, in step d2, inserting the target sample information into the second reference data to generate target sample data may include steps d21~d24.

Step d21, determining an insertion parameter corresponding to the second reference data, the insertion parameter including a number of insertion positions, a number of samples corresponding to each of the insertion positions, and a target information type corresponding to each of the insertion positions.

Step d22, determining insertion positions matching the number of insertion positions from the second reference data.

Step d23, acquiring sample information to be inserted corresponding to each of the insertion positions according to the number of samples corresponding to each of the insertion positions and the target information type corresponding to each of the insertion positions.

Step d24, inserting the sample information to be inserted corresponding to each of the insertion positions into the second reference data to generate target sample data.

In step d21, the insertion parameter corresponding to the second reference data is determined, the insertion parameter including a number of insertion positions, a number of samples corresponding to each of the insertion positions, and a target information type corresponding to each of the insertion positions. For example, if the number interval corresponding to the number of insertion positions is set to [1−n1], a number may be randomly selected from [1−n1] as the number of insertion positions of the second reference data. After determining the number of insertion positions, for each insertion position, the number of samples corresponding to the insertion position may be determined, and the number of samples corresponding to the insertion position represents the number of target sample information inserted at the insertion position. For example, if the number interval of the number of samples corresponding to the insertion position is set to [1−n2], a number may be randomly selected from [1−n2] as the number of samples corresponding to the insertion position. After determining the number of samples in the insertion position, the target information type corresponding to each insertion position may also be determined. For example, when the preset target information types include the phone type, the mail type, the address type and the name type, one or more target information types may be randomly selected from the preset target information types as the target information type corresponding to the insertion position, where n1 and n2 are positive integers, for example n1 may be 3, n2 may be 4, etc.

In step d22, for example, when the number of insertion positions is three, three insertion positions may be randomly determined from the second reference data. Alternatively, the position of each delimiter in the second reference data may be determined first, for example, the delimiter may include [";", ",", " ", "\n", "\t", "&"] and the like. Then the positions of three separators are selected, and the positions after the three separators are determined as the three insertion positions of the second reference data.

In step d23, for each insertion position, sample information to be inserted corresponding to the insertion position is acquired according to the number of samples corresponding to the insertion position and the target information type corresponding to the insertion position. For example, if the number of samples corresponding to the insertion position is 3 and the target information type is phone type, three sample information may be acquired as sample information to be inserted from a plurality of target sample information (positive sample information and/or negative sample information) included under the target information type. So that in step d24, the acquired sample information to be inserted may be inserted into the insertion position of the second reference data. The information to be inserted corresponding to each insertion position is inserted into the corresponding insertion position of the second reference data, and the target sample data is obtained.

By setting the insertion parameter, based on the insertion parameters and the determined insertion position, the acquired sample information to be inserted is inserted into the second reference data to generate the target sample data, which realizes the personalization and diversification of the target sample data and enriches the target sample data.

In step d3, because the candidate is to construct a sample data set, the positive sample data in the sample data set needs to be labeled, that is, the labeling information of the positive sample data is determined, which includes the target information type, the information sample value, the initial index position of the information sample value in the positive sample data, and the content information of the information sample value in the positive sample data.

In practice, the target information type included in the positive sample data may be determined according to the target information type of the sample information to be inserted. The information sample value of the sample information to be inserted may be determined as the information sample value included in the positive sample data. The initial index position of the information sample value in the positive sample data may be determined according to the index of the insertion position of the sample information to be inserted and the length of the keyword (such as the first keyword or the second keyword) in the sample information to be inserted; The keyword and the information sample value included in the sample information to be inserted may be determined as the content information of the information sample value in the positive sample data. Alternatively, a preset number may be set to determine the overall string consisting of a preset number of first strings before the sample information to be inserted, the sample information to be inserted, and a preset number of second strings after the sample information to be inserted, as content information of the information sample value in the positive sample data.

In step d4, a sample data set is constructed based on a plurality of pieces of negative sample data and positive sample data associated with labeling information. Alternatively, a sample data set may be constructed based on a plurality of pieces of negative sample data, positive sample data associated with labeling information, and second reference data without inserting sample information.

The present disclosure solve the problem that specific data is difficult to acquire, that is, by utilizing a small amount of first reference data with specific information (target information), by performing analysis processing on the specific information in the first reference data, and according to the analysis result, a large amount of positive sample information and negative sample information can be constructed, so that a large amount of positive sample data and negative sample data can be obtained in subsequent construction, and the risk of specific data leakage is alleviated. Moreover, after constructing a large number of positive sample information and negative sample information through the analysis result, the positive sample information and negative sample information are inserted into the second reference data. Because the labeling information of the positive sample information is known, the labeling information of the obtained positive sample data is easy to obtain, automatic labeling of specific data is realized, labor cost and time cost can be saved, labeling efficiency is improved, and the accuracy and completeness of labeling information are high, thus alleviating the cost problem, mislabeling and omission problem caused by manual labeling.

After obtaining the sample data set, the initial model to be trained may be trained by using the sample data set until the training cut-off condition is met, for example, the training cut-off condition may include that the number of training times being greater than a number threshold, the model converging, and the model precision being greater than a preset precision threshold, etc., and a specific information detection model can be generated, so that the specific information detection model can be deployed on a target device to realize the detection of specific information in any data to be detected.

By constructing positive sample information and negative sample information, the present disclosure realizes the generation of positive sample data and negative sample data, realizes the comparative learning scheme of specific information detection model, and enhances the sample data. At the same time, by training the specific information detection model with positive sample data and negative sample data, the distance between positive samples can be narrowed, and the distance between positive and negative samples can be pushed away, thereby improving the learning ability of the specific information detection model, reducing the false alarm of the specific information detection model on various specific data entities, and improving the overall recognition accuracy rate of specific data entities.

Figure 3:
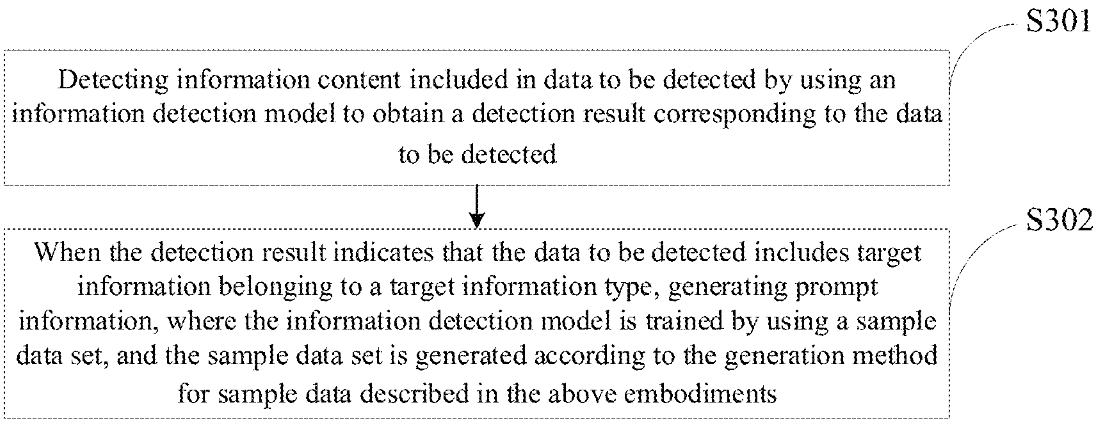
FIG. 3 shows a flowchart of a method for information detection provided by an embodiment of the present disclosure.

Based on the same inventive concept, FIG. 3 shows a flowchart of a method for information detection in an embodiment of the present disclosure, and the method includes S301-S302.

S301, detecting information content included in data to be detected by using an information detection model to obtain a detection result corresponding to the data to be detected.

S302, when the detection result indicates that the data to be detected includes target information belonging to a target information type, generating prompt information, where the information detection model is trained by using a sample data set, and the sample data set is generated according to the generation method for sample data described in the above embodiments.

In practice, the sample data set generated by the generation method for sample data described in the previous embodiment may be acquired, and the model to be trained may be trained by using the sample data set to obtain the information detection model. The information detection model is deployed on a target device, such as a server, a mobile device, etc. The information detection model is utilized to detect the information content included in the data to be detected, and the detection result corresponding to the data to be detected is obtained. If the detection result indicates that the data to be detected includes the target information belonging to the target information type, that is, the data to be detected includes the information of the information type with a security requirement, and the information cannot be leaked, so prompt information can be generated to prompt the user, alleviate the leakage of the data to be detected including the information content of the target information type, and improve data security. If the detection result indicates that the data to be detected does not include the target information belonging to the target information type, the data to be detected can be allowed to be transmitted or other operations can be performed.

Because the efficiency of the sample data set constructed by the above embodiment is high, and the sample data set includes abundant sample data, the efficiency of the information detection model obtained by training the sample data set is high, the performance of the obtained information detection model is good, and the detection result of the data to be detected can be obtained more accurately.

It can be understood by those skilled in the art that in the above-mentioned method of specific embodiments, the writing order of each step does not mean strict execution order and constitutes any limitation on the implementation process, and the specific execution order of each step should be determined according to its function and possible internal logic.

Based on the same inventive concept, the embodiment of the present disclosure further provides a generation apparatus for sample data corresponding to the generation method for sample data. Because the principle of solving problems by the apparatus in the embodiment of the present disclosure is similar to the above-mentioned generation method for sample data in the embodiment of the present disclosure, the implementation of the apparatus can refer to the implementation of the method, which will not be repeated here.

Figure 4:
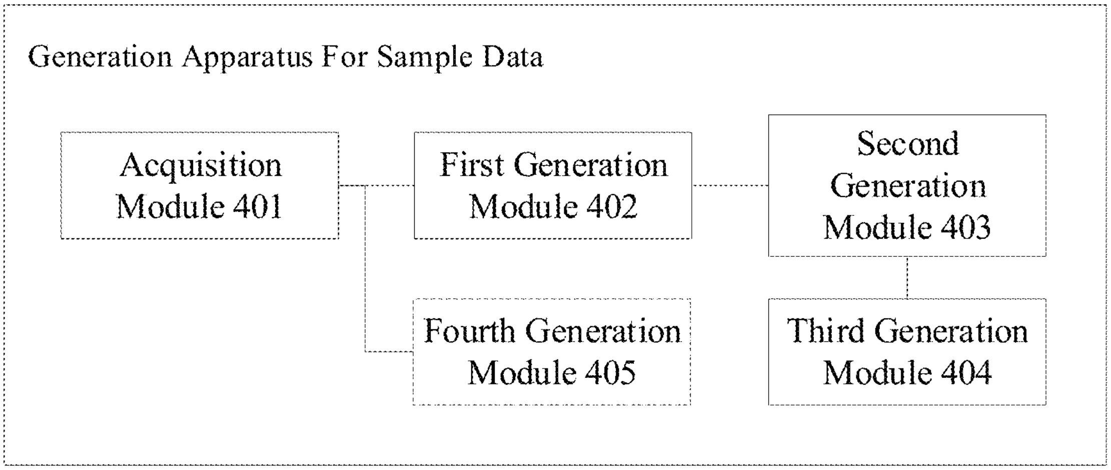
FIG. 4 shows a schematic diagram of a generation apparatus for sample data provided by an embodiment of the present disclosure.

FIG. 4 shows a schematic diagram of a generation apparatus for sample data provided by an embodiment of the present disclosure. The apparatus includes an acquisition module 401, a first generation module 402, a second generation module 403 and a third generation module 404.

The acquisition module 401 is configured to acquire first reference data, where the first reference data includes target information matching a target information type, and the target information type is a preset information type with a security requirement.

The first generation module 402 is configured to perform analysis processing on the target information in the first reference data to generate an analysis result corresponding to the target information, where the analysis processing includes semantic analysis, lexical structure analysis and grammatical structure analysis.

The second generation module 403 is configured to generate a plurality of positive sample information and a plurality of negative sample information based on the analysis result corresponding to the target information.

The third generation module 404 is configured to generate a sample data set including positive sample data and negative sample data based on the plurality of positive sample information, the plurality of negative sample information, and second reference data.

In a possible embodiment, the first generation module 402 when performing analysis processing on the target information in the first reference data to generate an analysis result corresponding to the target information, is configured to:

perform the semantic analysis on the target information in the first reference data to generate at least one first keyword corresponding to at least one target information type;

perform the lexical structure analysis on the target information in the first reference data to generate at least one first regular expression corresponding to the at least one target information type, where each of the at least one first regular expression is used to characterize a lexical structure matching the target information type;

perform the grammatical structure analysis on the target information in the first reference data to generate an information template matching a data type of the first reference data; and generate the analysis result corresponding to the target information based on the at least one first keyword and the at least one first regular expression corresponding to the at least one target information type and the information template matching the data type of the first reference data.

In an optional embodiment, the second generation module 403, when generating a plurality of positive sample information and a plurality of negative sample information based on the analysis result corresponding to the target information, is configured to:

for each target information type, generate a plurality of first information sample values which correspond to the target information type and satisfy a lexical structure of the target information type based on a first regular expression corresponding to the target information type;

according to the information template indicated by the analysis result, generate a plurality of positive sample information of the target information type based on a first keyword and the plurality of first information sample values corresponding to the target information type.

In an optional embodiment, the second generation module 403, when generating a plurality of positive sample information and a plurality of negative sample information based on the analysis result corresponding to the target information, is configured to:

for each target information type, perform preset operation on a first keyword corresponding to the target information type to generate a second keyword, where the preset operation includes a truncation operation and/or a character addition operation;

generate a second information sample value which does not satisfy a lexical structure of the target information type based on a first regular expression corresponding to the target information type; and according to the information template indicated by the analysis result, generate a plurality of negative sample information of the target information type based on the second keyword and the second information sample value corresponding to the target information type.

In an optional embodiment, the second generation module 403, when generating a second information sample value which does not satisfy a lexical structure of the target information type based on a first regular expression corresponding to the target information type, is configured to:

generate a first information sample value corresponding to the target information type based on the first regular expression corresponding to the target information type; performing a preset operation on the first information sample value corresponding to the target information type to generate the second information sample value; and/or generate a second regular expression which does not satisfy the lexical structure of the target information type based on the first regular expression corresponding to the target information type; generating the second information sample value corresponding to the target information type based on the second regular expression.

In an alternative embodiment, the first reference data further includes confusing information and the confusing information is information that interferes with detection of the target information; The apparatus further includes a fourth generation module 405, configured to:

perform the semantic analysis on the confusing information in the first reference data to generate a third keyword corresponding to at least one target information type;

determine a third information sample value corresponding to the third keyword from the confusing information; and generate a plurality of negative sample information of the target information type based on the third keyword and the third information sample value corresponding to the at least one target information type.

In an optional embodiment, the number of pieces of second reference data is more than one, and the third generation module 404 is configured to:

for each piece of second reference data, determine an insertion scheme of the second reference data based on a set proportional parameter and a random number generated for the second reference data, where the insertion scheme includes inserting positive sample information, inserting negative sample information, and not inserting sample information;

when the insertion scheme of the second reference data is inserting target sample information, insert the target sample information into the second reference data to generate target sample data, where the target sample information includes the positive sample information and/or the negative sample information, when the target sample information includes the positive sample information, the target sample data includes the positive sample data, and when the target sample information includes the negative sample information, the target sample data includes the negative sample data;

determine labeling information of the positive sample data, where the labeling information includes the target information type, information sample value, an initial index position of the information sample value in the positive sample data, and content information of the information sample value in the positive sample data; and form the sample data set based on a plurality of pieces of negative sample data and positive sample data associated with the labeling information.

In an optional embodiment, the third generation module 404, when inserting the target sample information into the second reference data to generate target sample data, is configured to:

determine an insertion parameter corresponding to the second reference data, where the insertion parameter includes a number of insertion positions, a number of samples corresponding to each of the insertion positions, and a target information type corresponding to each of the insertion positions;

determine insertion positions matching the number of insertion positions from the second reference data;

acquire sample information to be inserted corresponding to each of the insertion positions according to the number of samples corresponding to each of the insertion positions and the target information type corresponding to each of the insertion positions;

insert the sample information to be inserted corresponding to each of the insertion positions into the second reference data to generate target sample data.

Figure 5:
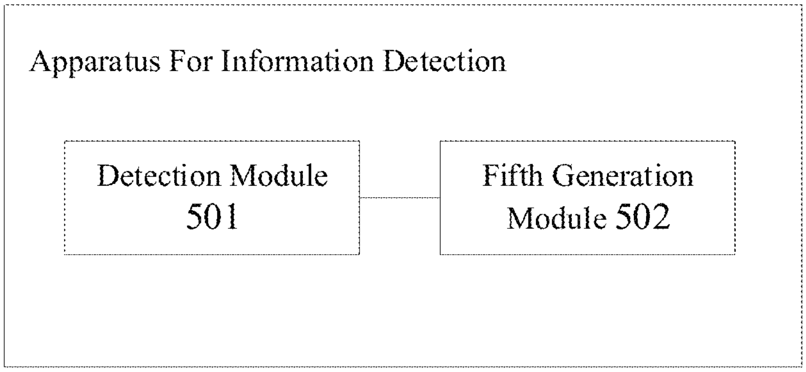
FIG. 5 shows a schematic diagram of an apparatus for information detection provided by an embodiment of the present disclosure.

FIG. 5 shows a schematic diagram of an apparatus for information detection provided by an embodiment of the present disclosure, and the apparatus includes a detection module 501 and a fifth generation module 502.

The detection module 501 is configured to detect information content included in data to be detected by using an information detection model to obtain a detection result corresponding to the data to be detected.

The fifth generation module 502 is configured to generate prompt information when the detection result indicates that the data to be detected includes target information belonging to a target information type, where the information detection model is trained by using a sample data set, and the sample data set is generated according to the generation method for sample data described in the above embodiments.

Figure 6:
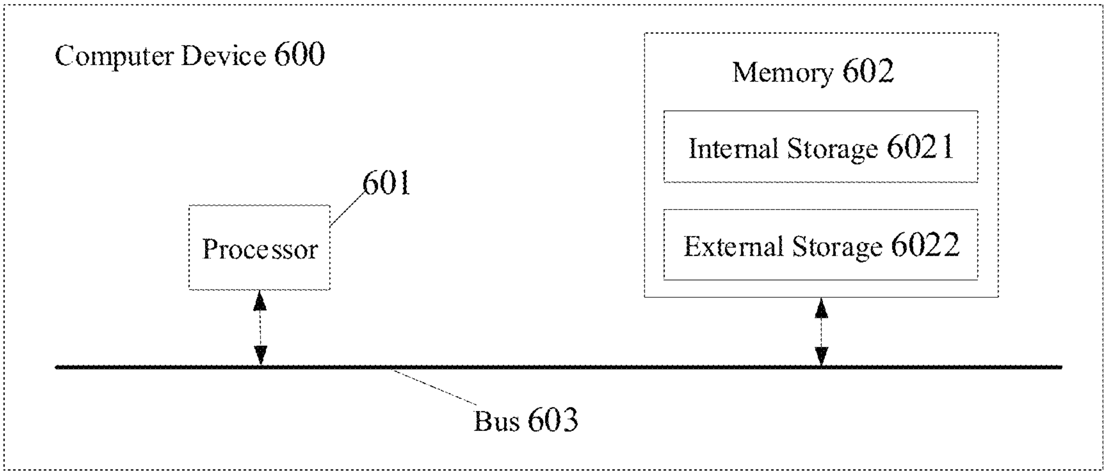
FIG. 6 shows a structural schematic diagram of a computer device provided by an embodiment of the present disclosure.

Based on the same technical concept, the embodiment of the present disclosure further provides a computer device. Referring to FIG. 6, FIG. 6 is a structural schematic diagram of a computer device 600 provided by an embodiment of the present disclosure includes at least one processor 601, a memory 602, and a bus 603. The memory 602 is used to store executable instructions, including an internal storage 6021 and an external storage 6022. The internal storage 6021, also called an internal memory, is used for temporarily storing operation data in the processor 601 and data exchanged with the external storage 6022 such as a hard disk. The processor 601 exchanges data with the external storage 6022 through the internal storage 6021; when the computer device 600 runs, the processor 601 communicates with the memory 602 through the bus 603, causing the processor 601 to execute the following instructions:

acquiring first reference data, the first reference data including target information matching a target information type, and the target information type being a preset information type with a security requirement;

performing analysis processing on the target information in the first reference data to generate an analysis result corresponding to the target information, the analysis processing including semantic analysis, lexical structure analysis and grammatical structure analysis;

generating a plurality of positive sample information and a plurality of negative sample information based on the analysis result corresponding to the target information; and generating a sample data set including positive sample data and negative sample data based on the plurality of positive sample information, the plurality of negative sample information, and second reference data.

Or the processor 601 executes the following instructions:

detecting information content included in data to be detected by using an information detection model to obtain a detection result corresponding to the data to be detected; and when the detection result indicates that the data to be detected includes target information belonging to a target information type, generating prompt information, where the information detection model is trained by using a sample data set, and the sample data set is generated according to the generation method for sample data described in the above embodiments.

An embodiment of the present disclosure further provides a computer-readable storage medium storing computer programs, and the computer programs upon being run by at least one processor, execute the steps of the generation method for sample data and the method for information detection described in the above method embodiment. The storage medium may be a volatile or nonvolatile computer-readable storage medium.

An embodiment of the present disclosure further provides a computer program product carrying program codes, the program codes including instructions that can be used to execute the steps of the generation method for sample data and the method for information detection described in the above-mentioned method embodiment. For details, please refer to the above-mentioned method embodiment, and the details are not repeated here.

The computer program product may be specifically implemented by hardware, software or a combination thereof. In one alternative embodiment, the computer program product is embodied as a computer storage medium, and in another alternative embodiment, the computer program product is embodied as a software product, such as a software development kit (SDK) and the like.

It can be clearly understood by those skilled in the art that, for convenience and simplicity of description, specific working processes of the system and the apparatus described above may refer to the corresponding processes in the foregoing method embodiment, which are omitted here. In the several embodiments provided in the present disclosure, it is to be understood that the disclosed system, apparatus, and method may be implemented in other manners. The above-described apparatus embodiments are merely illustrative. For example, the division of the units may be merely a logical function division, and in actual implementation, there may be another division mode. For another example, multiple units or components may be combined or integrated into another system, or some features may be omitted, or may not be executed. In addition, the displayed or discussed mutual couplings or direct couplings or communication connections may be implemented through some communication interfaces. The indirect couplings or communication connections between the apparatuses or units may be implemented in electronic, mechanical, or other forms.

The units described as separate parts may or may not be physically separate, and the components displayed as units may or may not be physical units, that is, they may be located in one position, or may be distributed on a plurality of network units. Some or all of the units may be selected according to actual needs to achieve the purposes of the solutions of the embodiments.

In addition, functional units in the embodiments of the present disclosure may be integrated into one processing unit, or each unit may exist alone physically, or two or more units may be integrated into one unit.

The functions, if implemented in software functional units and sold or used as a stand-alone product, may be stored in a nonvolatile computer-readable storage medium executable by a processor. Based on such understanding, the technical solutions of the present disclosure, which are essential or part of the technical solutions contributing to the related art, may be embodied in the form of a software product, which software product is stored in a storage medium and includes several instructions for causing a computer device (which may be a personal computer, a server, or a network device, etc.) to execute all or part of the steps of the methods described in the embodiments of the present disclosure. The aforementioned storage medium includes a U disk, a mobile hard disk, a read-only memory (ROM), a random access memory (RAM), a magnetic disk or an optical disk and other media that can store program codes.

Finally, it should be noted that the above-mentioned embodiments are merely specific embodiments of the present disclosure, which are used to illustrate the technical solutions of the present disclosure, but not to limit the technical solutions, and the scope of protection of present disclosure is not limited thereto. Although the present disclosure is described in detail with reference to the foregoing embodiments, those of ordinary skill in the art should understand that any person familiar with the art can still make modifications or changes to the embodiments described in the foregoing embodiments, or make equivalent substitutions for some of the technical features, within the technical scope of the present disclosure; and such modifications, changes or substitutions do not make the essence of the corresponding technical solution deviate from the spirit and scope of the technical solutions of the embodiments of the present disclosure, and should be included in the scope of protection of the present disclosure. Therefore, the scope of protection of the present disclosure shall be subject to the scope of protection of the appended claims.

The invention claimed is:

1. A generation method for sample data, executed on a computer device and comprising:

acquiring, by a processor, first reference data, wherein the first reference data comprises target information matching a target information type, and the target information type is a preset information type with a security requirement;

performing, by the processor, an analysis processing on the target information in the first reference data to generate an analysis result corresponding to the target information, wherein the analysis processing comprises semantic analysis, lexical structure analysis and grammatical structure analysis;

generating a plurality of positive sample information and a plurality of negative sample information based on the analysis result corresponding to the target information; and generating a sample data set comprising positive sample data and negative sample data based on the plurality of positive sample information, the plurality of negative sample information, and second reference data, wherein the performing analysis processing on the target information in the first reference data to generate an analysis result corresponding to the target information comprises:

performing the semantic analysis on the target information in the first reference data to generate at least one first keyword respectively corresponding to at least one target information type;

performing the lexical structure analysis on the target information in the first reference data to generate at least one first regular expression respectively corresponding to the at least one target information type, wherein each of the at least one first regular expression is used to characterize a lexical structure matching the target information type;

performing the grammatical structure analysis on the target information in the first reference data to generate an information template matching a data type of the first reference data; and generating the analysis result corresponding to the target information based on the at least one first keyword and the at least one first regular expression respectively corresponding to the at least one target information type and the information template matching the data type of the first reference data, wherein the sample data set is used to train a specific data detection model.

2. The generation method according to claim 1, wherein the generating the plurality of positive sample information and the plurality of negative sample information based on the analysis result corresponding to the target information comprises:

for each target information type of the at least one target information type, generating a plurality of first information sample values which correspond to the target information type and satisfy a lexical structure of the target information type based on a first regular expression corresponding to the target information type; and according to an information template indicated by the analysis result, generating the plurality of positive sample information of the target information type based on a first keyword and the plurality of first information sample values corresponding to the target information type.

3. The generation method according to claim 1, wherein the generating the plurality of positive sample information and the plurality of negative sample information based on the analysis result corresponding to the target information comprises:

for the each target information type of the at least one target information type, performing preset operation on a first keyword corresponding to the target information type to generate a second keyword, wherein the preset operation comprises at least one selected from the group consisting of a truncation operation and a character addition operation;

generating a second information sample value which does not satisfy a lexical structure of the target information type based on a first regular expression corresponding to the target information type; and according to an information template indicated by the analysis result, generating a plurality of negative sample information of the target information type based on the second keyword and the second information sample value corresponding to the target information type.

4. The generation method according to claim 3, wherein the generating the second information sample value which does not satisfy a lexical structure of the target information type based on a first regular expression corresponding to the target information type comprises:

generating a first information sample value corresponding to the target information type based on the first regular expression corresponding to the target information type; performing a preset operation on the first information sample value corresponding to the target information type to generate the second information sample value; and/or generating a second regular expression which does not satisfy the lexical structure of the target information type based on the first regular expression corresponding to the target information type; generating the second information sample value corresponding to the target information type based on the second regular expression.

5. The generation method according to claim 1, wherein the first reference data further comprises confusing information, the confusing information is information that interferes with detection of the target information, and the generation method further comprises:

performing the semantic analysis on the confusing information in the first reference data to generate a third keyword corresponding to at least one target information type;

determining a third information sample value corresponding to the third keyword from the confusing information; and generating a plurality of negative sample information of the target information type based on the third keyword and the third information sample value corresponding to the at least one target information type.

6. The generation method according to claim 1, wherein a number of pieces of second reference data is more than one, and the generating a sample data set comprising positive sample data and negative sample data based on the plurality of positive sample information, the plurality of negative sample information, and the second reference data comprises:

for each piece of the second reference data, determining an insertion scheme of the second reference data based on a set proportional parameter and a random number generated for the second reference data, wherein the insertion scheme comprises inserting positive sample information, inserting negative sample information, and not inserting sample information;

when the insertion scheme of the second reference data is inserting target sample information, inserting the target sample information into the second reference data to generate target sample data, wherein the target sample information comprises at least one selected from a group consisting of the positive sample information and the negative sample information, when the target sample information comprises the positive sample information, the target sample data comprises the positive sample data, and when the target sample information comprises the negative sample information, the target sample data comprises the negative sample data;

determining labeling information of the positive sample data, wherein the labeling information comprises the target information type, information sample value, an initial index position of the information sample value in the positive sample data, and content information of the information sample value in the positive sample data; and forming the sample data set based on a plurality of pieces of negative sample data and positive sample data associated with the labeling information.

7. The generation method according to claim 6, wherein the inserting the target sample information into the second reference data to generate target sample data comprises:

determining an insertion parameter corresponding to the second reference data, wherein the insertion parameter comprises a number of insertion positions, a number of samples corresponding to each of the insertion positions, and a target information type corresponding to the each of the number of insertion positions;

determining insertion positions matching the number of insertion positions from the second reference data;

acquiring sample information to be inserted corresponding to each of the insertion positions according to the number of samples corresponding to each of the insertion positions and the target information type corresponding to each of the insertion positions; and inserting the sample information to be inserted corresponding to each of the insertion positions into the second reference data to generate target sample data.

8. The generation method according to claim 1, wherein the sample data set generated according to the generation method is used to train an information detection model, the information detection model is used to detect information content comprised in data to be detected to obtain a detection result corresponding to the data to be detected, and when the detection result indicates that the data to be detected comprises target information belonging to a target information type, prompt information is generated.

9. A computer device, comprising:

at least one processor, a memory and a bus, wherein the memory stores machine-readable instructions executable by the at least one processor; the at least one processor communicates with the memory through the bus upon running of the computer device, and the machine-readable instructions, upon being executed by the at least one processor, execute a generation method for sample data, and the generation method for sample data comprises:

acquiring first reference data, wherein the first reference data comprises target information matching a target information type, and the target information type is a preset information type with a security requirement;

performing analysis processing on the target information in the first reference data to generate an analysis result corresponding to the target information, wherein the analysis processing comprises semantic analysis, lexical structure analysis and grammatical structure analysis;

generating a plurality of positive sample information and a plurality of negative sample information based on the analysis result corresponding to the target information; and generating a sample data set comprising positive sample data and negative sample data based on the plurality of positive sample information, the plurality of negative sample information, and second reference data, wherein the performing analysis processing on the target information in the first reference data to generate an analysis result corresponding to the target information comprises:

performing the semantic analysis on the target information in the first reference data to generate at least one first keyword respectively corresponding to at least one target information type;

performing the lexical structure analysis on the target information in the first reference data to generate at least one first regular expression respectively corresponding to the at least one target information type, wherein each of the at least one first regular expression is used to characterize a lexical structure matching the target information type;

performing the grammatical structure analysis on the target information in the first reference data to generate an information template matching a data type of the first reference data; and generating the analysis result corresponding to the target information based on the at least one first keyword and the at least one first regular expression respectively corresponding to the at least one target information type and the information template matching the data type of the first reference data, wherein the sample data set is used to train a specific data detection model.

10. The computer device according to claim 9, wherein the generating the plurality of positive sample information and the plurality of negative sample information based on the analysis result corresponding to the target information comprises:

for each target information type of the at least one target information type, generating a plurality of first information sample values which correspond to the target information type and satisfy a lexical structure of the target information type based on a first regular expression corresponding to the target information type; and according to an information template indicated by the analysis result, generating the plurality of positive sample information of the target information type based on a first keyword and the plurality of first information sample values corresponding to the target information type.

11. The computer device according to claim 9, wherein the generating the plurality of positive sample information and the plurality of negative sample information based on the analysis result corresponding to the target information comprises:

for the each target information type of the at least one target information type, performing preset operation on a first keyword corresponding to the target information type to generate a second keyword, wherein the preset operation comprises at least one selected from the group consisting of a truncation operation and a character addition operation;

generating a second information sample value which does not satisfy a lexical structure of the target information type based on a first regular expression corresponding to the target information type; and according to an information template indicated by the analysis result, generating the plurality of negative sample information of the target information type based on the second keyword and the second information sample value corresponding to the target information type.

12. The computer device according to claim 11, wherein the generating a second information sample value which does not satisfy a lexical structure of the target information type based on a first regular expression corresponding to the target information type comprises:

generating a first information sample value corresponding to the target information type based on the first regular expression corresponding to the target information type; performing a preset operation on the first information sample value corresponding to the target information type to generate the second information sample value; and/or generating a second regular expression which does not satisfy the lexical structure of the target information type based on the first regular expression corresponding to the target information type; generating the second information sample value corresponding to the target information type based on the second regular expression.

13. The computer device according to claim 9, wherein the first reference data further comprises confusing information, the confusing information is information that interferes with detection of the target information, and the generation method further comprises:

performing the semantic analysis on the confusing information in the first reference data to generate a third keyword corresponding to at least one target information type;

determining a third information sample value corresponding to the third keyword from the confusing information; and generating the plurality of negative sample information of the target information type based on the third keyword and the third information sample value corresponding to the at least one target information type.

14. The computer device according to claim 9, wherein a number of pieces of second reference data is more than one, and the generating a sample data set comprising positive sample data and negative sample data based on the plurality of positive sample information, the plurality of negative sample information, and the second reference data comprises:

for each piece of the second reference data, determining an insertion scheme of the second reference data based on a set proportional parameter and a random number generated for the second reference data, wherein the insertion scheme comprises inserting positive sample information, inserting negative sample information, and not inserting sample information;

when the insertion scheme of the second reference data is inserting target sample information, inserting the target sample information into the second reference data to generate target sample data, wherein the target sample information comprises at least one selected from a group consisting of the positive sample information and the negative sample information, when the target sample information comprises the positive sample information, the target sample data comprises the positive sample data, and when the target sample information comprises the negative sample information, the target sample data comprises the negative sample data;

determining labeling information of the positive sample data, wherein the labeling information comprises the target information type, information sample value, an initial index position of the information sample value in the positive sample data, and content information of the information sample value in the positive sample data; and forming the sample data set based on a plurality of pieces of negative sample data and positive sample data associated with the labeling information.

15. The computer device according to claim 14, wherein the inserting the target sample information into the second reference data to generate target sample data comprises:

determining an insertion parameter corresponding to the second reference data, wherein the insertion parameter comprises a number of insertion positions, a number of samples corresponding to each of the insertion positions, and a target information type corresponding to each of the insertion positions;

determining insertion positions matching the number of insertion positions from the second reference data;

acquiring sample information to be inserted corresponding to each of the insertion positions according to the number of samples corresponding to each of the insertion positions and the target information type corresponding to each of the insertion positions; and inserting the sample information to be inserted corresponding to each of the insertion positions into the second reference data to generate target sample data.

16. A non-transitory computer-readable storage medium storing computer programs, wherein the computer programs, upon being run by at least one processor, execute a generation method for sample data, and the generation method for sample data comprises:

acquiring first reference data, wherein the first reference data comprises target information matching a target information type, and the target information type is a preset information type with a security requirement;

performing analysis processing on the target information in the first reference data to generate an analysis result corresponding to the target information, wherein the analysis processing comprises semantic analysis, lexical structure analysis and grammatical structure analysis;

generating a plurality of positive sample information and a plurality of negative sample information based on the analysis result corresponding to the target information; and generating a sample data set comprising positive sample data and negative sample data based on the plurality of positive sample information, the plurality of negative sample information, and second reference data.

* * * * *